Dec. 3, 1929.　　　D. R. LOVEJOY　　　1,737,973
CONTACT MAKING GAUGE
Filed April 22, 1926
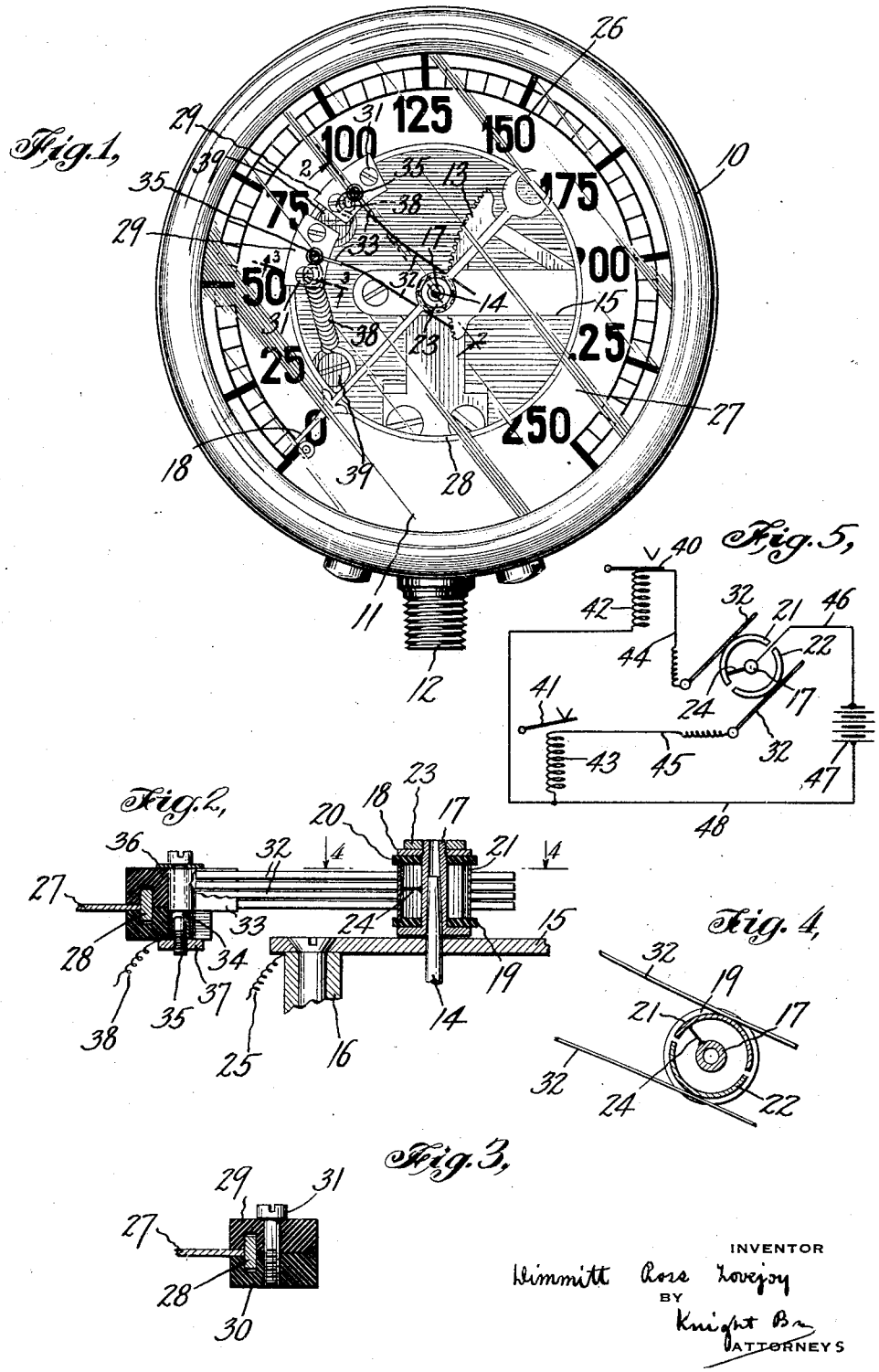
INVENTOR
Hammitt Ross Lovejoy
BY
Knight Br
ATTORNEYS Patented Dec. 3, 1929

1,737,973

UNITED STATES PATENT OFFICE

DIMMITT ROSS LOVEJOY, OF NEW YORK, N. Y., ASSIGNOR TO U. S. E. M. COMPANY, OF NEW YORK, N. Y., A CORPORATION OF NEW YORK

CONTACT-MAKING GAUGE

Application filed April 22, 1926. Serial No. 103,878.

This invention relates to indicating, recording or controlling gauges in which means are provided for establishing electrical circuits upon or during the occurrence of certain conditions to which the gauge is responsive. It is well illustrated by way of example in the case of a pressure gauge having a rotary indicating pointer moving over a circular or annular scale surrounding the axis of movement, by which pressure changes in the system are indicated.

Important objects of the invention are to provide gauges with contact making apparatus which will entail a minimum damping of the free movement of the indicator in response to the changes of pressure or other condition actuating it, to insure good electrical contact and to provide for facility of adjustment of the contact making mechanism so as to obtain electrical response with a good degree of accuracy.

An embodiment of the invention is illustrated by way of example in the accompanying drawing, assuming the case of a pressure gauge. In said drawing:

Figure 1 indicates a face view of a pressure gauge having the improved contact making mechanism applied thereto;

Figure 2 is a detail section of the mounting of the contact making members, taken on the line 2—2 of Figure 1, and viewed in the direction of the arrows;

Figure 3 is a detail section through a portion of the adjustable brush holder shown in position on the supporting rail, the section being taken on the line 3—3 of Figure 1, in the direction of the arrows;

Figure 4 is a detail cross section taken on the line 4—4 of Figure 2 in the direction of the arrows, showing the contact of the brushes with the contact segments carried by the indicator shaft; and Figure 5 is a circuit diagram illustrating the application of the mechanism to the actuation of a pair of relays.

The gauge illustrated is enclosed in a case 10 provided with a glass cover 11 and the threaded pipe connection 12 in usual manner. The toothed sector 13 provided with the ordinary operating connection with the shaft 14 caused the rotation of the shaft corresponding with changes in pressure. The upper end of the shaft 14 passes through the bridge 15 mounted on posts 16 and is tapered to receive the conical bore of the collar or drum member 17 which carries the pointer 18. The collar 17 is flanged at the bottom and has slipped over it an insulation disk 19 and an insulation disk 20 which have mounted between them the commutator segments 21 and 22, the parts being maintained in position by a nut 23 which screws down upon the threaded outer end of the collar 17 against the pointer 18, as clearly shown in Figure 2. The commutator segment 21 is electrically connected as by conductor 24 with the collar 17 and is thus grounded in the framework of the instrument. A lead-off conductor 25 is indicated in Figure 2 as being connected with the framework for establishing the circuit through the latter to the commutator segment 21. The segment 22 is insulated and is intended in the present example to constitute an open circuit section of the commutator, as will be understood. As the shaft or arbor 14 carrying the pointer and commutator drum revolves, the pointer 18 moves over a scale 26 which is laid out around the periphery of the annular face 27. The annular face 27 is provided on its inner periphery with a rail or flange 28 to receive one or more brush holders, each of which comprises a pair of insulating blocks 29, 30 provided with recesses of a contour and size to fit over the rail 28, as clearly shown in Figures 2 and 3. A pair of screws or bolts 31 clamp the two blocks in position against the inner portion of the annular face 27. These blocks 29, 30 are, furthermore, provided with recesses opening inwardly toward the center of the gauge for the purpose of receiving a brush and holding it in position to make contact with the commutator drum carried by the pointer shaft or arbor 14. These brushes are preferably made up of a plurality of brush members 32 (see Figure 2) which are fitted into head pieces 33 each of which has a small tube 34 adapted to fit within the recesses of the brush holder. The brush members 32, the head portion 33 and the tube 34 may all be soldered together to constitute a unit which may readily be inserted into the socketed brush holders and secured therein by means of a bolt 35, washer 36 and nut 37.

To each of the brushes I attach a flexible conductor 38 which has its other end connected to a binding post 39 which is insulated in the base of the gauge. This flexible conductor 38 is shown clearly in Figure 1 and diagrammatically indicated in Figure 2. The brush members 32 may be made, for example, of a silver ribbon or bar of suitable strength and stiffness. They are adjusted in the brush holders 29, 30 so as to rest against the operating faces of the commutator segments 21, 22, as shown, for example, in Figures 4 and 5. In order to set these brushes in proper positions to establish or open the electrical circuits at the desired upper or lower limits of pressure or other condition of control, the screws or bolts 31 are loosened sufficiently to permit the blocks to slide along the rail 28 until the correct positions have been reached whereupon the screws are tightened and the brush holders thus clamped securely in place upon the rail. According to my invention, it is always intended that the brushes shall be secured and supported on the track or dial face surrounding the pointer arbor and shall project inwardly to contact against the commutator segments which move with the dial arbor, as in this way the damping of the gauge pointer is much less than would be occasioned by mounting the brushes in the center and causing them to swing over a surrounding contact member at a distance from the center, where much more power would be required to overcome the resistance. The wiping contact which the brushes make with the commutator segments maintains the electrical connection sufficiently clean to render a heavy pressure and high friction on the commutator drum unnecessary.

Referring to Figure 5, I have here indicated diagrammatically the application of the invention to the control of two relays. These relays are indicated by the armatures 40 and 41 which are controlled respectively by the solenoid coils 42 and 43, one of which is connected at one end through conductor 44 to brush 32, and the other of which is connected at one end through conductor 45 to the other brush 32.

The grounded commutator segment 21 is electrically connected through conductor 46 with battery 47 and conductor 48 to the other ends of the solenoid coils 42 and 43. When the gauge arbor 14 revolves far enough to throw the grounded segment 21 from the upper brush 32 to the lower brush 32, the circuit through solenoid 42 is thereby opened, releasing the armature 40 and the circuit through solenoid 43 is thereby closed, drawing down the armature 41. It is not deemed necessary to describe in further detail the operation of the relay coils, which are not a part of my present invention but have been mentioned to this extent to make clear the application of the invention thereto.

I claim:—

1. A contact making gauge comprising a rotary member responsive to the physical condition to be measured, a contact segment rotatable therewith, a supporting rail surrounding said contact segment, a brush holder adjustable circumferentially on said supporting rail, a resilient brush projecting inwardly from said holder and bearing tangentially against said contact segment, and circuit connections to said contact segment and said brush.

2. A contact making gauge comprising a rotary indicator member, a concentrically disposed contact segment rotatable therewith, a pair of brush holders independently adjustable in a circular path concentrically surrounding said contact segment, a brush projecting inwardly from each holder and adapter to bear tangentially against said contact segment, and circuit connections to said contact segment and said brushes.

3. A contact making gauge comprising a rotary indicator member, a contact segment rotatable therewith, an annular dial and dial rail surrounding said rotary indicator member, a circumferentially adjustable brush holder clamped on said dial rail, a brush projecting inwardly from said holder and bearing against said contact segment, and circuit connections to said contact segment and said brush.

4. A contact making gauge comprising a rotary indicator member, a commutator comprising grounded and open circuited contact segments rotatable therewith, a plurality of brush holders independently adjustable in a concentric circular path surrounding said contact segments, a plurality of brushes projecting inwardly from said holders and bearing against said commutator segments, and flexible conductors secured at one end to insulated binding posts in the gauge base and at the other end to the respective brushes.

DIMMITT ROSS LOVEJOY.